United States Patent [19]
Itoh et al.

[11] 3,934,961
[45] Jan. 27, 1976

[54] THREE LAYER ANTI-REFLECTION FILM

[75] Inventors: Susumu Itoh, Tokyo; Keijiro Nishida, Kanagawa; Osamu Kamiya, Tokyo; Nobuyuki Sekimura, Yokohama, all of Japan

[73] Assignee: Canon Kabushiki Kaisha, Japan

[22] Filed: Sept. 21, 1973

[21] Appl. No.: 399,612

Related U.S. Application Data

[63] Continuation-in-part of Ser. No. 192,394, Oct. 26, 1971, abandoned.

[30] Foreign Application Priority Data

Oct. 29, 1970 Japan.................. 45-95438

[52] U.S. Cl................ 350/164; 427/166; 428/432; 428/539; 428/213
[51] Int. Cl.².................................. G02B 5/28
[58] Field of Search........ 350/164; 117/33.3, 169 R, 117/211, 69

[56] References Cited
UNITED STATES PATENTS

| | | | |
|---|---|---|---|
| 3,176,575 | 4/1965 | Socha | 117/33.3 X |
| 3,185,020 | 5/1965 | Thelen | 117/33.3 X |
| 3,271,179 | 9/1966 | Smith | 117/33.3 |
| 3,463,574 | 8/1969 | Bastien et al. | 350/164 |
| 3,695,910 | 10/1972 | Louderback et al. | 117/33.3 |
| 3,781,090 | 12/1973 | Sumita | 350/164 |

*Primary Examiner*—Ralph S. Kendall
*Assistant Examiner*—John D. Smith
*Attorney, Agent, or Firm*—Toren, McGready and Stanger

[57] ABSTRACT

Three-layer anti-reflection coatings consisting of first, second and third layers, respectively positioned from a glass base plate. The optical film thickness of the first layer and the second layer is one-half of a designed wavelength while that of the third layer is one-fourth of the same. And the relationship among the refractive index of each layer is second layer ($n_2$) glass ($n_g$) first layer ($n_1$) third layer ($n_3$). The first layer is made of a mixture of $Al_2O_3$ and $ZrO_2$.

5 Claims, 7 Drawing Figures

THREE LAYER ANTI-REFLECTION FILM

This application is a continuation-in-part of copending application Ser. No. 192,394 filed on Oct. 26, 1971

BACKGROUND OF THE INVENTION

1. Field of Invention

This invention relates to three-layer anti-reflection coatings for application to an optical system for substantially eliminating reflections over a relatively wide range of the visible spectrum.

2. Brief Description of the Prior Art

Three-layer anti-reflection coatings wherein the optical film thickness of the first and second layer is one-half of the designed wavelength while that of the third layer is one-fourth of the designed wavelength have been disclosed in U.S. Pat. No. 3,604,784 to Louderback, and granted on Sept. 14, 1971. A method of forming a film by mixing two kinds of metal oxides for obtaining a desired refractive index is also known.

SUMMARY OF INVENTION

The present inventors have discovered two kinds of metal oxides which are particularly suitable for the first layer in the three layer anti-reflection coatings in which the optical film thickness of the first and second layers is one-half of the designed wavelength while that of the third layer is one-fourth of the designed wavelength.

The suitability of these oxides is determined by the following:

1. Even if the evaporation temperature varies somewhat at the time when the two kinds of metal oxides are evaporated on a glass base plate, the composition ratio of the two kinds of metal oxides in said coating does not change, therefore a desired refractive index can be obtained.

2. No light absorbing characteristics will be shown in a visible spectrum range.

3. Good adhesion to the glass base plate, with no peel off at all.

4. Chemically stable with good durability. In order to meet the first requirement, two such kinds of metal oxides having almost equal evaporation pressure characteristics against the evaporation temperature variation are suited.

The present inventors have discovered aluminium oxide ($Al_2O_3$) and zirconium oxide ($ZrO_2$) as satisfactory metal oxides meeting the above requirements. These metal oxides are known to form an anti-reflection coating either alone or by mixing with substances other than the above mentioned metal oxides. However, it has not been known to form a coating by the mixture of $Al_2O_3$ and $ZrO_2$.

Therefore, the present invention is to provide three-layer anti-reflection coatings in which an object the first layer is made of a mixture of $Al_2O_3$ and $ZrO_2$ which have almost equal vapor pressure characteristics against temperature variation, and the first and the second layers have optical film thickness of $\lambda o/2$ and in which the third layer has a thickness of $\lambda o/4$.

DETAILED DESCRIPTION OF THE PREFERRED EMBODIMENTS

The inventors of the present application have discovered that the mixture of aluminium oxide and zirconium oxide is most suited as the composition of the first layer in the anti-reflection coatings which are made of a first layer, a second layer and a third layer being positioned in said order from a glass base plate, wherein the optical thickness of each layer is such that the first layer $\lambda o/2$, the second layer $\lambda o/2$, and the third layer $\lambda o/2$; and $\lambda o$ = designed wavelength, while the refractive index of each layer is such that the second layer > glass base plate > the first layer > the third layer.

Next, explanations shall be made concerning the use of aluminium oxide and zirconium oxide, referring to the attached drawings.

Figure 1:
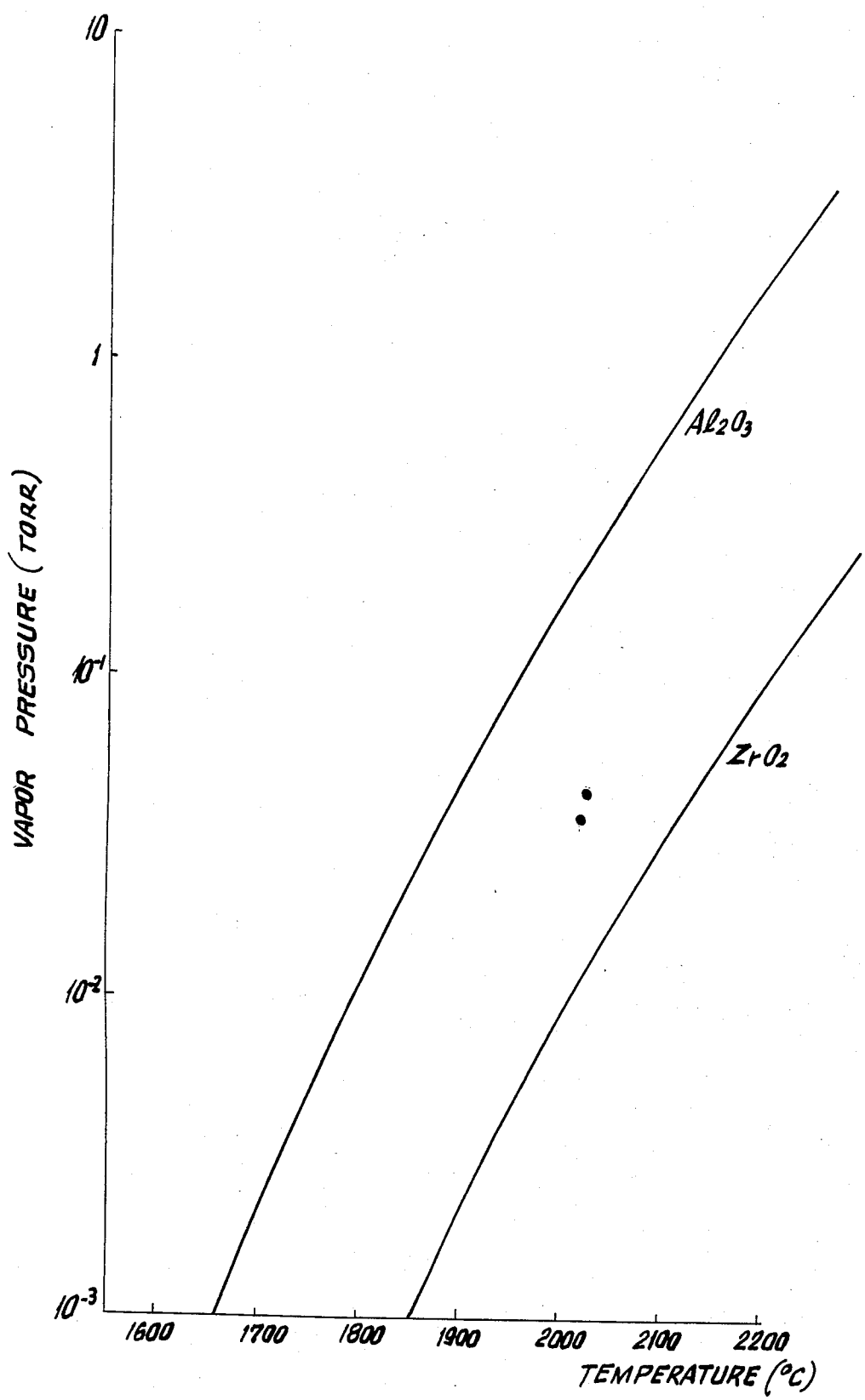
FIG. 1 is a graph diagram showing the vapor pressure of aluminium oxide ($Al_2O_3$) and zirconium oxide ($ZrO_2$) against temperature variation.

FIG. 1 is to show relationship of vapor pressure (Torr) of the aluminium oxide and the zirconium oxide against temperature (°C). As is apparent from this drawing, the vapor pressure characteristics of the aluminium oxide and zirconium oxide against temperature have such relationship which allows parallel shifting. Therefore, it will be understood that even if there is some variation in temperature, the ratio of evaporation of the aluminium oxide and the zirconium oxide will not vary.

Figure 2:
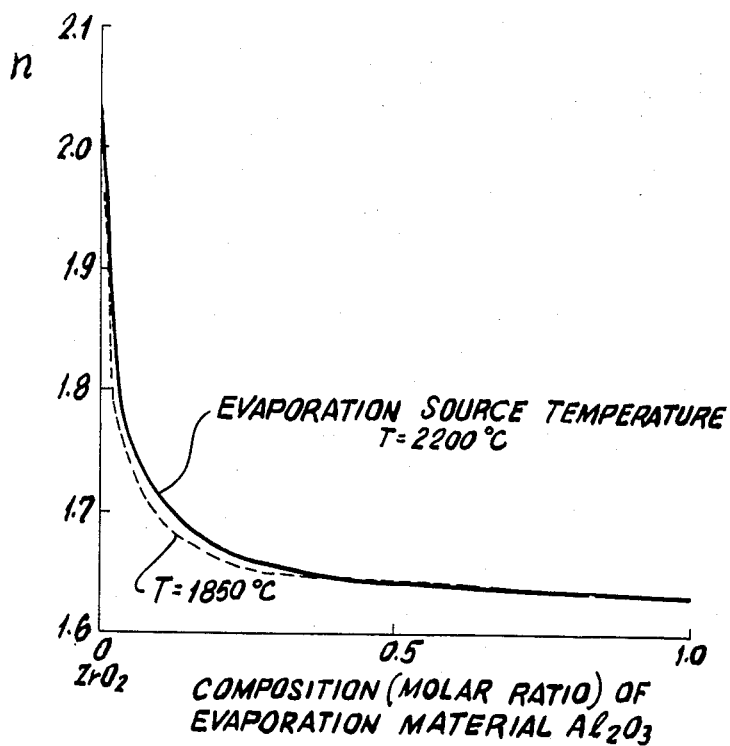
FIG. 2 shows the refractive index of evaporation coating of aluminium oxide ($Al_2O_3$) and zirconium oxide ($ZrO_2$) against evaporation material with different compositions (molar ratio) for evaporation source temperatures of 1850°C and 2200°C.

FIG. 2 shows the relationship of the refractive index of the layer formed against the combination of the composition (molar ratio) of the evaporating material when the temperature at the evaporation source is 1850°C and 2200°C. In this drawing, the solid line shows 2200°C while broken line shows 1850°C. As is apparent from this drawing, the refractive index varies chiefly in relation with the composition of the evaporation material while the temperature of the evaporation source does not have much effect on said variation. That is, in other words, a desired refractive index of the layer can be easily obtained by varying the mixing ratio of the aluminium oxide and the zirconium oxide, while a layer with desired refractive index can be obtained even if the temperature of the evaporation source varies somewhat.

Experimental examples of the present invention shall be explained using FIG. 3 to FIG. 7.

The apparatus used in the following experimentations was as follows:

1. Vacuum evaporation device: Ordinarily available vacuum evaporation device.
2. Electron gun: Electron gun TIH-270 which is commercially available.
3. Glass base plate: Optical glass (BK-7)

And the condition was as follows:
1. Base plate temperature: 280°C
2. Distance between evaporation source and the glass base plate: 68 cm
3. Degree of vacuum: $1 \times 10^{-6}$ Torr 4. Temperature of evaporation source: 2200° and 1850°C The evaporation material is made by mixing powder of aluminium oxide ($Al_2O_3$) and zirconium oxide ($ZrO_2$) with different mixing ratio and is then molded.

EXPERIMENT I

Figure 3:
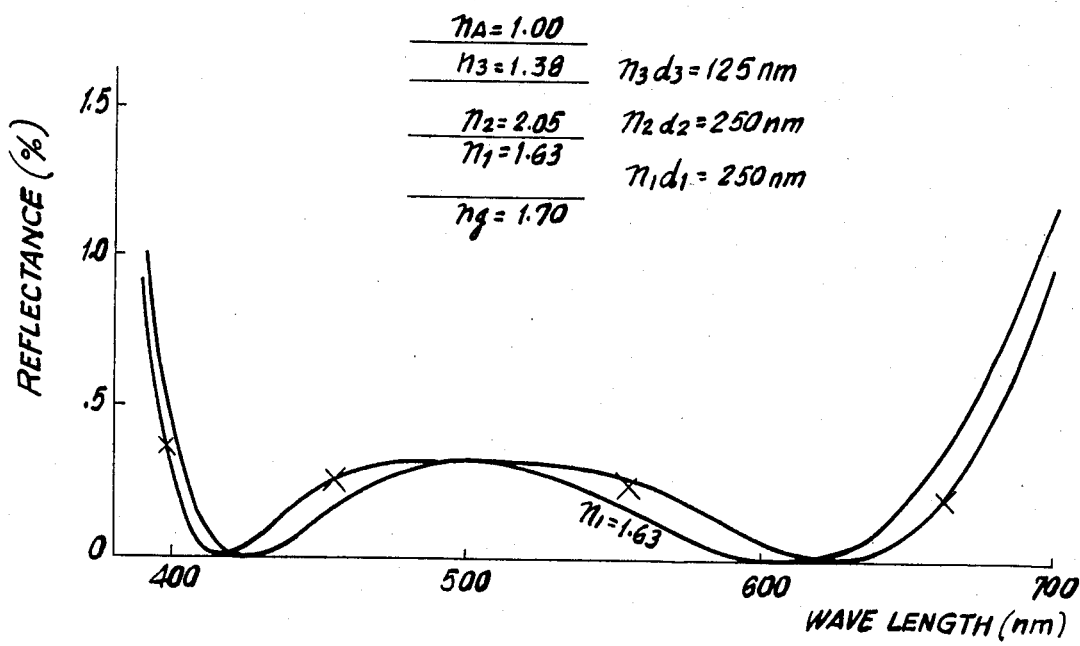
Figure 4:
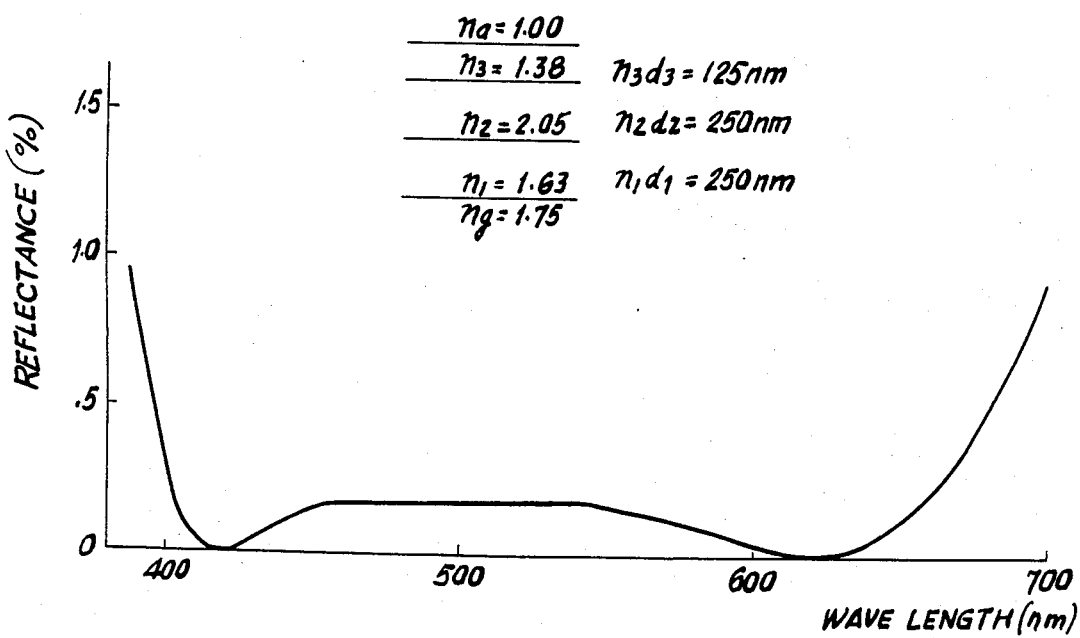

FIG. 3 and FIG. 4 show a case when the refractive index ng of the glass base plate is 1.70, 1.75, respectively. These glass plates with refractive index of 1.70 and 1.75 were chosen as typical examples of glass base plates with refractive indices from 1.65 to 1.775.

An evaporating material in which aluminium oxide and zirconium oxide are mixed having a ratio (molar ratio) of 100 : 1 was used and evaporation was performed for one minute with evaporation area of 0.44 cm². By said process, a first layer with refractive index of 1.63 and optical film thickness of 250 nm was obtained.

Next a second layer was formed with zirconium oxide ($ZrO_2$) used as evaporating material. This second layer had optical film thickness of 250 nm and refractive index of 2.05. Further a third layer was formed with magnesium fluoride ($MgF_2$) used as an evaporating material. The third layer had optical film thickness of 125 nm and refractive index of 1.38. The three-layer anti-reflection coatings thus obtained had, as shown in FIG. 3 and FIG. 4, a low reflection factor against a wide range of wavelength.

EXPERIMENT II

Figure 5:
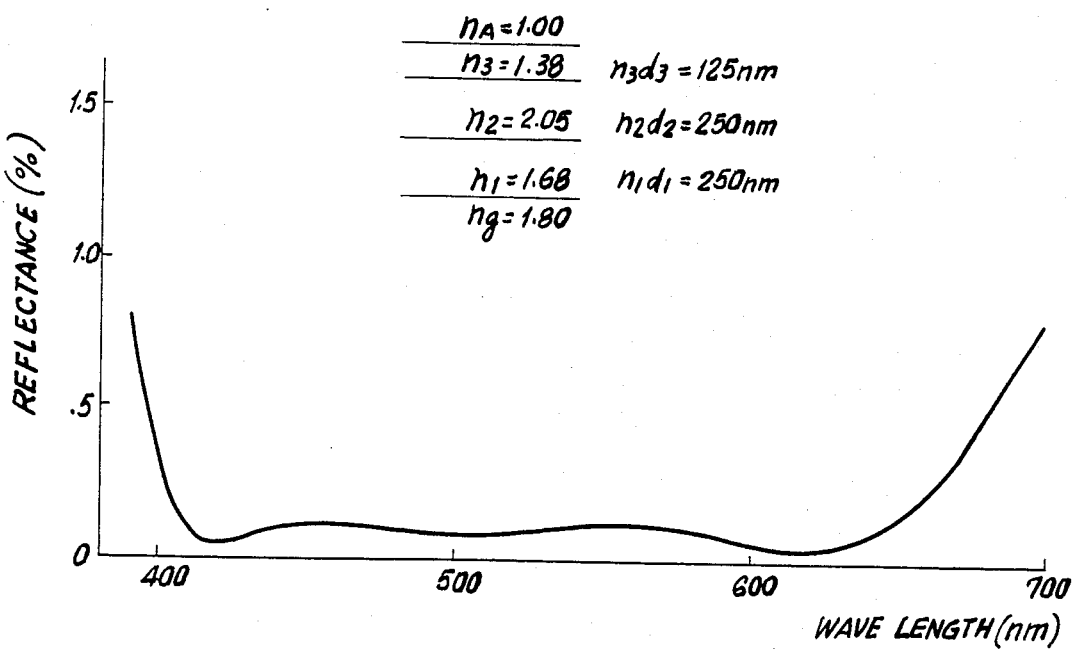

FIG. 5 shows a case when the refractive index ng of a glass base plate is 1.80. This glass plate with refractive index ng of 1.80 was choosen as a typical example of the glass base plates having refractive indices of 1.775 to 1.825.

Evaporation was done for 1.5 minutes with evaporation area of 1.08 cm² using such evaporation material as obtained by mixing aluminium oxide and zirconium oxide with a molar ratio of 17 : 83. By this, a first layer having refractive index of 1.68 and an optical film thickness of 250 nm was obtained.

Next, a second layer was formed with zirconium oxide ($ZrO_2$) used as the evaporating material. This second layer had an optical film thickness of 250 nm and a refractive index of 2.05. Further, a third layer was formed using magnesium fluoride ($MgF_2$) as the evaporating material. The third layer had an optical film thickness of 125 nm and a refractive index of 1.38. The three-layer anti-reflection coatings thus obtained had low reflective factor, as shown in FIG. 5, against a wide range of wavelength.

EXPERIMENT III

Figure 6:
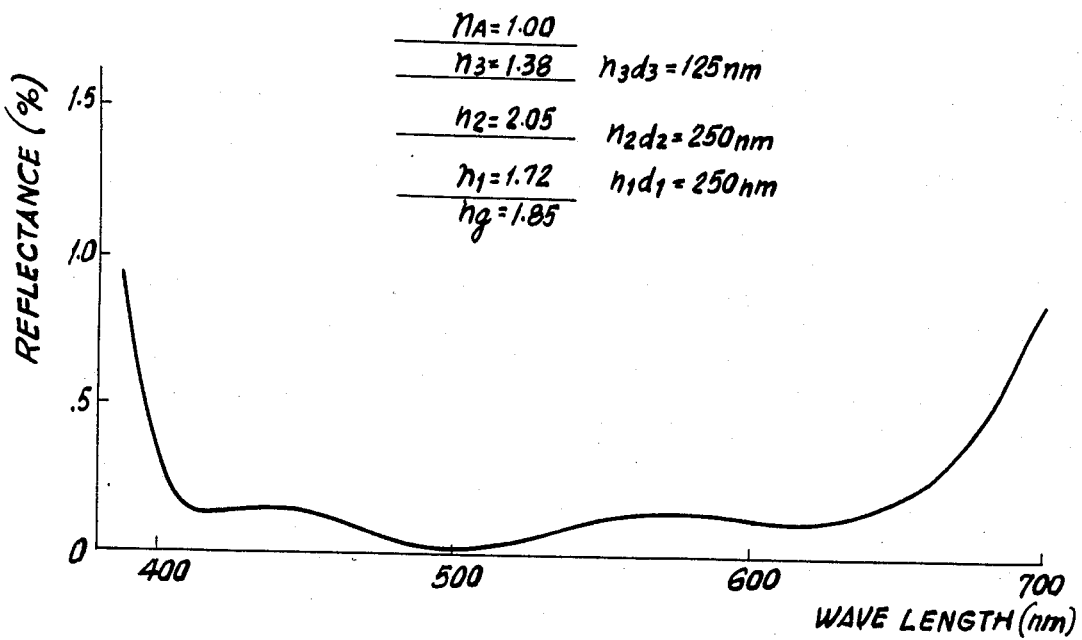

FIG. 6 shows a case when the refractive index ng of the glass base plate is 1.85. This glass base plate with refractive index ng of 1.85 was chosen as a typical example of the glass base plates with refractive index of 1.825 to 1.875.

Evaporation was performed for three minutes with an evaporation area of 0.85 cm² using evaporating material obtained by mixing aluminium oxide and zirconium oxide with a ratio (molar ratio) of 9 : 91. A first layer with refractive index of 1.72 and optical film thickness of 250 nm was obtained.

Next, a second layer was obtained with zirconium oxide ($ZrO_2$) used as evaporating material. This second layer had an optical film thickness of 250 nm and refractive index of 2.05. Further, a third layer was formed using magnesium fluoride ($MgF_2$) as an evaporating material. The third layer had an optical film thickness of 125 nm and a refractive index of 1.38.

The three-layer anti-reflection coatings thus obtained had, as shown in FIG. 6, low reflection factor against wide range of wavelength.

EXPERIMENT IV

Figure 7:
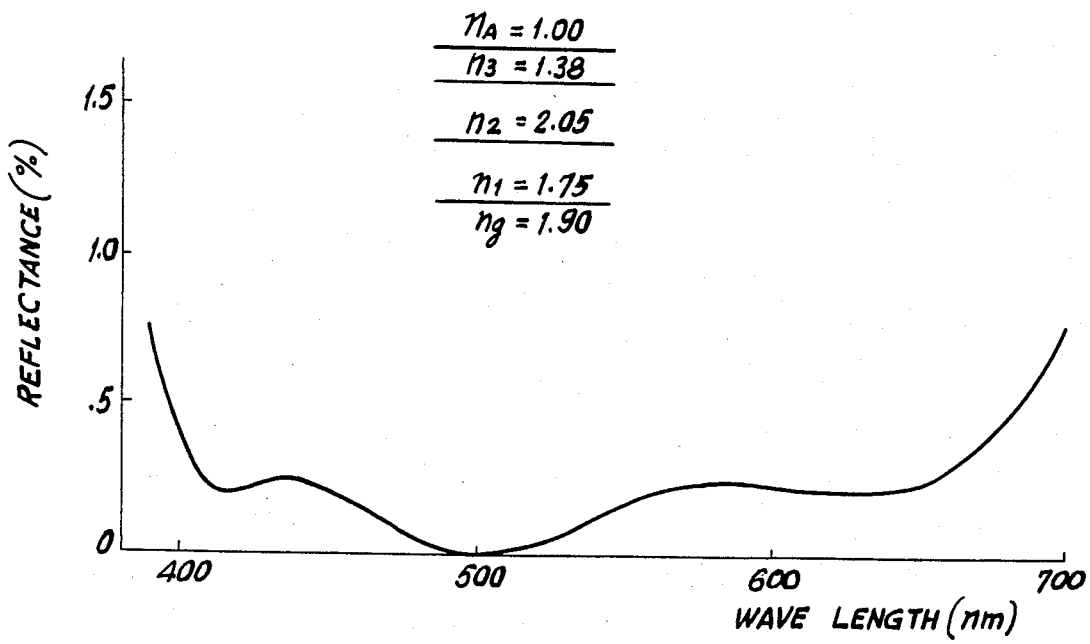
FIGS. 3, 4, 5, 6, 7 show the three layer anti-reflection coatings of the present invention and the wavelength-reflection factor, wherein each one of them illustrates the case when the refractive index of the glass base plate is, respectively, 1.70, 1.75, 1.80, 1.85, 1.90.

FIG. 7 shows a case when the refractive index ng of the glass base plate is 1.90. This glass base plate with the refractive index ng of 1.90 was chosen as a typical example of glass base plates having refractive indices of 1.875 to 1.925.

Evaporation was performed for 4 minutes with evaporation area of 0.83 cm² using evaporating material made by mixing aluminium oxide and zirconium oxide with a ratio (molar ratio) of 6 : 94. Thus, a first layer with a refractive index of 1.75 and an optical film thickness of 250 nm was obtained.

Next, a second layer was formed with zirconium oxide ($ZrO_2$) used as an evaporating material. This second layer had an optical film thickness of 250 nm and a refractive index of 2.05. Further, a third layer was formed using magnesium fluoride ($MgF_2$) as the evaporating material. The third layer had an optical film thickness of 125 nm and a refractive index of 1.38. The three-layer anti-reflection coatings thus obtained had, as shown in FIG. 7, low reflection factor against wide range of wavelength.

While in the above experiment explanations were made for the cases when zirconium oxide ($ZrO_2$) was used for a second layer, similar effect may be obtained by using tantalum oxide ($Ta_2O_5$), titanium oxide ($TiO_2$), ceric oxide ($CeO_2$) or mixture thereof in lieu of the above.

As has been explained above, the present invention has such advantages that a first layer with a desired refractive index can be obtained easily by varying the mixing ratio of aluminium oxide and zirconium oxide, and at the same time such first layer as having desired refractive index can be obtained even if there is variation in evaporation temperature.

What is claimed is:

1. A three-layer anti-reflection coating deposited by vapor-deposition consisting of a first layer, a second layer and a third layer being positioned in the recited order from a glass base plate:
   the first layer having an optical thickness of one-half the designed wavelength and being composed of aluminium oxide and zirconium oxide;
   the second layer having an optical thickness of one-half the designed wavelength; and
   the third layer having an optical thickness of one-fourth the designed wavelength,
wherein the relationship among the refractive indices of the glass base plate, the first layer, the second layer, and the third layer is
   that the second layer > the glass base plate > the first layer > the third layer.

2. A three-layer anti-reflection coating deposited by vapor deposition consisting of a first layer, a second layer and a third layer being positioned in the recited order from a glass base plate with a refractive index of from 1.65 to 1.775:
   the first layer having an optical thickness of one-half the designed wavelength and a refractive index of 1.63, said first layer being composed of aluminium oxide and zirconium oxide;

the second layer having an optical thickness of one-half the designed wavelength and a refractive index of about 2.05; and the third layer having an optical thickness of one-fourth of the designed wavelength and a refractive index of 1.38.

3. A three layer anti-reflection coating deposited by vapor deposition consisting of a first layer, a second layer and a third layer being positioned in the recited order from a glass base plate with a refractive index of from 1.775 to 1.825:

the first layer having an optical thickness of one-half the designed wavelength and a refractive index of 1.68, said first layer being composed of aluminium oxide and zirconium oxide;

the second layer having an optical thickness of one-half the designed wavelength and a refractive index of about 2.05; and the third layer having an optical thickness of one-fourth the designed wavelength and a refractive index of 1.38.

4. A three layer anti-reflection coating deposited by vapor deposition consisting of a first layer, a second layer and a third layer being positioned in the recited order from a glass base plate with a refractive index of from 1.825 to 1.875:

the first layer having an optical thickness of one-half the designed wavelength and a refractive index of 1.72, being composed of aluminium oxide and zirconium oxide;

the second layer having an optical thickness of one-half the designed wavelength and a refractive index of about 2.05; and the third layer having an optical thickness of one-fourth of the designed wavelength and a refractive index of about 1.38.

5. A three layer anti-reflection coating deposited by vapor deposition consisting of a first layer, a second layer and a third layer being positioned in the recited order from a glass base plate with a refractive index of from 1.875 to 1.925:

the first layer having an optical thickness of one-half the designed wavelength and a refractive index of 1.75, being composed of aluminium oxide and zirconium oxide;

the second layer having an optical thickness of one-half the designed wavelength and a refractive index of about 2.05; and the third layer having an optical thickness of one-fourth the designed wavelength and a refractive index of about 1.38.

* * * * *